United States Patent [19]

Fukuda

[11] Patent Number: 5,168,266
[45] Date of Patent: Dec. 1, 1992

[54] METHOD FOR DETECTING LONGITUDINAL TEAR IN A CONVEYOR BELT

[75] Inventor: Masahisa Fukuda, Kobe, Japan

[73] Assignee: Bando Kagaku Kabushiki Kaisha, Japan

[21] Appl. No.: 679,247

[22] Filed: Apr. 2, 1991

[30] Foreign Application Priority Data

Apr. 17, 1990 [JP] Japan ................... 2-100741

[51] Int. Cl.⁵ ............................. G08B 21/00
[52] U.S. Cl. ..................... 340/676; 198/810; 324/67; 324/226
[58] Field of Search ............ 340/676; 198/810; 324/67, 226

[56] References Cited

U.S. PATENT DOCUMENTS

| | | | |
|---|---|---|---|
| 3,636,436 | 1/1972 | Kurauchi et al. | 340/676 |
| 3,651,506 | 3/1972 | Olaf et al. | 340/676 |
| 4,447,807 | 5/1984 | Klein et al. | 340/676 |
| 4,854,446 | 8/1989 | Strader | 340/676 |

*Primary Examiner*—Glen R. Swann, III
*Attorney, Agent, or Firm*—Marshall, O'Toole, Gerstein, Murray & Bicknell

[57] ABSTRACT

At each of a plurality of points of embedment in a conveyor belt, a set of at least two detectable elements is embedded, and a control unit is arranged (a) to receive and process signals from an externally installed sensor, the signals having a varied intensity corresponding to the number of detectable elements in a given embedment point, (b) to average the intensities of a plurality of the signals for the given embedment point, and (c) to judge, on the basis of the average obtained in (b), the presence or absence of a breakage of detectable element or elements at the given embedment point. The above-mentioned arrangement is able to judge whether one of the two detectable elements is broken, and the judgment is not affected by variation of the distance between detectable elements and the sensor. If breakage of a single detectable element of any set is identified, the affected element may be repaired during an outage of the conveyor. In this way, breakage of two elements of a point without any longitudinal tear will be eliminated.

2 Claims, 3 Drawing Sheets

METHOD FOR DETECTING LONGITUDINAL TEAR IN A CONVEYOR BELT

FIELD AND BACKGROUND OF THE INVENTION

The present invention relates to a method for automatically detecting any longitudinal tear that is generated in a conveyor belt during its operation.

During the operation of a conveyor belt, if an object, for example, a sharp piece of metal, sticks into the belt, the piece could work like a knife to tear the belt in its travelling direction (or longitudinal direction of movement). Longitudinal tear may occur even to steel cord conveyor belts since the cords are embedded in the longitudinal direction of the belts.

To prevent such a longitudinal tear from growing in length, some belts have detectable elements including a linear portion, such as a loop coil or a resonance circuit, embedded in the belt at successive intervals along the travelling direction, and the conditions of such detectable elements are monitored by sensors. A sensor is installed at an external fixed point close to the travel path of the belt to detect a signal generated by each detectable element passing by the sensor point and transmit it to a control unit. When a longitudinal tear occurs in the belt, a detectable element will be broken and the sensor, in turn, will not detect nor transmit a signal. Then the control unit will judge that a longitudinal tear has occurred and will halt the operation of the belt. In this way the longitudinal tear will be controlled and held to a minimum. The belt may be placed in service again after a minor repair. A technique for such detection of longitudinal tear is disclosed, for example, in Provisional Patent Publication No. SHO-62-285813.

In recent years there have been provided some conveyor belts having a pair of the above-mentioned detectable elements embedded at each point. This arrangement is intended to extend the service life of each pair of the detectable elements and, in turn, to enhance their reliability since the detectable elements are usually made of a low strength wire that will reliably break whenever a longitudinal tear occurs, and as such the detectable elements may break due to bending fatigue or the like without occurrence of any longitudinal tear. Thus even when one of the two detectable elements is broken, the remaining element will be sufficient to maintain the same detection performance as that of two normal (unbroken) elements. To assure that proper judgment is made stably regardless of the number of detectable elements, the signal from each pair of elements is amplified to a fixed saturation level; the signal is thus treated as an on-or-off signal.

In the conventional method in which pairs of detectable elements are embedded in a conveyor belt to detect any longitudinal tear therein according to the presence or absence (on or off) of a signal from each pair of detectable elements, any abnormality of a pair of the detectable elements cannot be detected until both the elements are broken, and will be detected only after both the elements are broken. This arrangement has the following disadvantages:

a) As it is not possible to detect a break of one element alone, and hence it is not possible to repair until both elements are broken, the time would eventually come when both detectable elements of a pair are broken unless the detectable elements have an exceptionally long service life. When both of the detectable elements of a pair are broken, in contrast with the case of a break of a single element, the control unit will be forced to judge that a longitudinal tear occurred in the belt and, in turn, to stop the operation of the conveyor regardless of the circumstances. Even if the case is actually a break of a pair of detectable elements due to fatigue or the like rather than a longitudinal tear and it is not desirable to halt the conveyor operation due to nonessential reasons, the operator of the conveyor will be forced to halt the conveyor and inspect it. In the case of a genuine longitudinal tear, it is natural to halt the conveyor and repair the belt without delay. In the case of a break of detectable elements, stoppage due to, say, a malfunction of the detector, and inspection will reduce the efficiency of production significantly.

b) If both detectable elements of a pair are broken without any longitudinal tear, except when they can be repaired immediately, the conveyor must be operated without any information on the conveyor portion in which the affected elements are embedded until the elements are repaired during the next outage. The frequency of periodical outage of a conveyor for maintenance is about once per month in many cases, thus blind operation may continue for nearly thirty days. The conventional method, therefore, may bring about a period of very low reliability of longitudinal tear detection while it is intended to improve the same reliability.

SUMMARY OF THE INVENTION

The present invention is intended to eliminate the aforementioned inconveniences by providing a method for detecting a longitudinal tear whereby two detectable elements are embedded at each point of the conveyor belt and any break of a detectable element or elements at each point (even when only one element is broken) can be judged or determined so as to avoid the stoppage of the conveyor operation due to malfunction other than the occurrence of a longitudinal tear and the condition of blind operation thereafter.

In the longitudinal tear detection method according to the present invention, any breakage of detectable elements embedded at a plurality of points of a conveyor belt is detected by an externally installed sensor, and a signal indicating such breakage is sent to a control unit to detect, if any, a longitudinal tear, in the belt. At each point, a set of two of the detectable elements is embedded in the belt. The control unit is arranged (a) to respond to signals from a sensor, the signals having varied intensity corresponding to the number of detectable elements in a given point of embedment, (b) to average the intensities of a plurality of said signals for the given embedment point, and (c) to judge, on the basis of the average obtained in (b), the presence or absence of breakage of a detectable element or elements at a given embedment point.

If a detectable element embedded in the conveyor belt is not broken, a signal generated by the detectable element when the embedment point thereof passes by the sensor installation point will be detected by the sensor and transmitted to the control unit. If at least one of the two detectable elements of the set at a given embedment point is sound (not broken), the point will be judged to be free of any longitudinal tear. The control unit will judge that there is no longitudinal tear at the given point and the operation of the conveyor will be continued as long as a signal is detected from at least one of the pair of detectable elements by the sensor. On the other hand, if the sensor detects no signal when an embedment point of detectable elements is expected to pass by the sensor installation point, the control unit will judge that both the detectable elements are broken by a longitudinal tear and will halt the operation of the conveyor.

The method of the present invention is that it judges the presence or absence of one breakage in each set of two detectable elements, with a clear distinction from the presence of two sound elements. In the method according to the present invention, this function is effected by the following procedure:

a) The sensor detects a signal having an intensity corresponding to the number of sound detectable elements and transmits the signal to the control unit. On the other hand, the control unit handles the signal as a quantitative signal (a signal of which the intensity thereof can be compared with others) rather than an on-off signal (presence or absence of the signal). Whether the detectable element be a loop coil or a resonance circuit or anything else, the intensity of the signal generated by the detectable elements will be normally reduced when the number of elements is reduced by breakage. It, therefore, is easy for the control unit to form such a processing when an analog sensor, for example, is used.

b) The control unit stores the above-mentioned extensive signal for each set of the detectable elements (each embedment point) and then computes the average for the repeated measurements. In ordinary cases, the control unit is able to make judgment in the stage of a) above when a detectable element is broken. The inclusion of the process of b) in the method of the present invention is to provide for the possible variation, in the case of a conveyor belt, of the intensity of the signal detected by the sensor according to the distance between the belt and the sensor as well as the number of sound detectable elements. Since the conveyor belt is an elastic body and tends to vibrate easily and yields according to the weight of the object to be conveyed, the distance between the belt and the sensor varies constantly. The effects of such variations are eliminated by averaging a plurality of measurements.

c) Moreover, the control unit determines whether both detectable elements of a given embedment point are sound or one of the elements thereof is broken by comparing the signal intensity (average) determined by a) and b) above with the standard (or initial) signal intensities set in advance according to the number of detectable elements (one and two) for each embedment point.

When one of the two detectable elements is judged to be broken, there should be no longitudinal tear in the conveyor belt, and the operation of the conveyor may be continued. During the next outage of the conveyor, however, it is better to repair or replace the broken detectable element (to be followed by embedment). In this way, undesirable events such as suspension of conveyor operation due to breakage of two elements of a point without any longitudinal tear and blind operation thereafter will be mostly eliminated.

BRIEF DESCRIPTION OF THE DRAWINGS

The attached drawings show a preferred embodiment of the present invention.

FIG. 2 (b) is a view taken along the line b—b of FIG. 2 (a); and

DETAILED DESCRIPTION

Figure 2A:
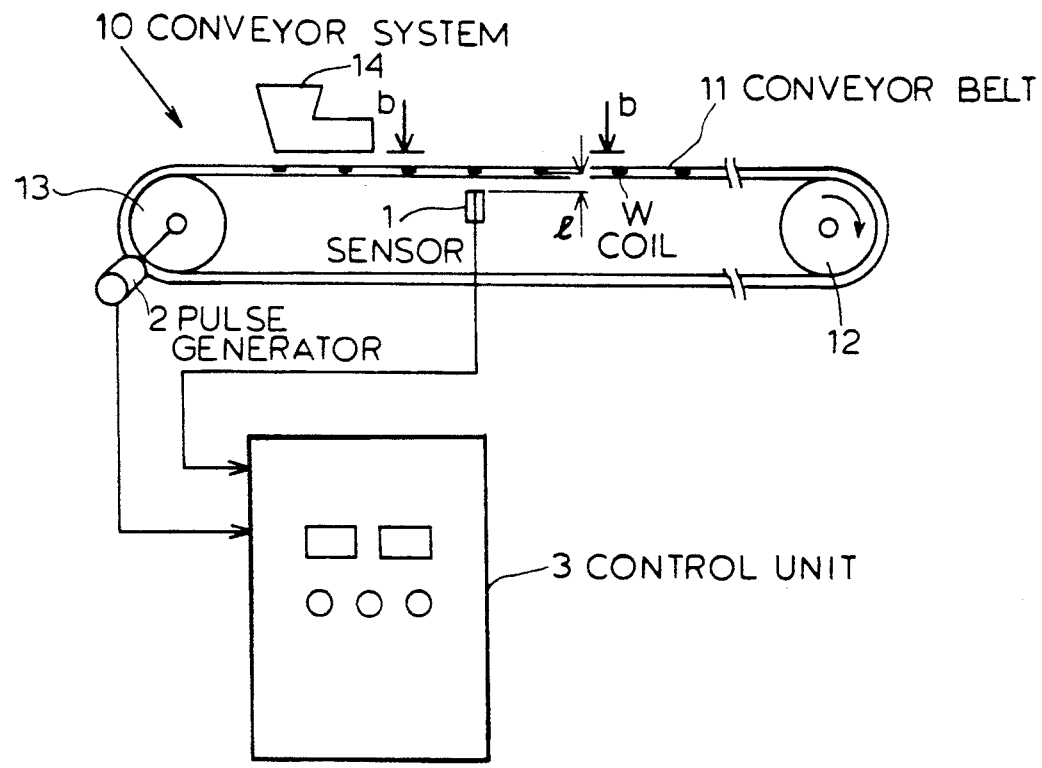
FIG. 2 (a) is a schematic structural diagram showing a conveyor system and a control system for detecting longitudinal tear.
Figure 2B:
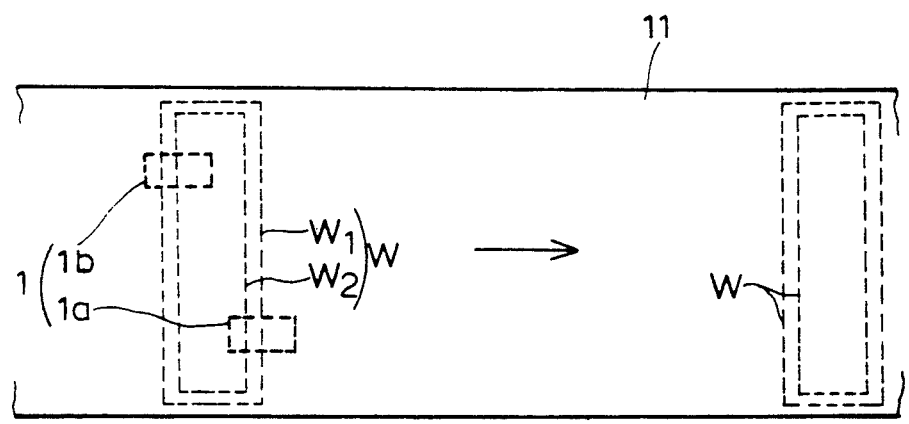

With reference first to FIG. 2 (a), a conveyor system 10 comprises a steel cord conveyor belt 11 spanned across a drive pulley 12 and a driven or idler pulley 13, and in a typical arrangement conveys bulk material fed from a hopper or chute 14. Inside the belt 11 are embedded loop coils w (FIG. 2(b)) at intervals along the travelling direction thereof. Each coil w is, as shown in FIG. 2 (b) by broken lines, a set of two closed loops (coils $w_1$, and $w_2$), each of the closed coils comprising a rectangular conductor of which the longer sides almost cover the full width of the belt 11. Each coil w is made of a low-strength wire which reliably breaks whenever a longitudinal tear occurs in the belt 11, yet, because it is given a wavy shape (not illustrated), rarely breaks due to normal bending during routine use.

The control system for detecting longitudinal tear comprises, as shown in FIG. 2 (a), a sensor 1 installed at a fixed point close to the lower surface of the upper span or length of the belt 11, a pulse generator 2 coupled to the rotary shaft of the driven pulley 13, and a control unit 3 to which the sensor 1 and the pulse generator 2 are connected. The construction and functions of the respective components of the control system are as described below:

First, the sensor 1 is, as shown in FIG. 2 (b), a combination of a high-frequency oscillator 1a and a receiver 1b. As shown in FIG. 2 (a), the sensor 1 is spaced from the belt and fixed in a position such that the distance between the top ends of the oscillator 1a and the receiver 1b and a coil w in the belt 11 is l. When the belt 11 travels, a coil w ($w_1$ or $w_2$) will move to the installation point of the sensor 1. If the coil w is sound (without break), an induced current will be generated in the coil w by high-frequency waves from the oscillator 1a, and lines of magnetic force due to the induced current will be detected by the 1b. The sensor 1 also has the functions of detecting and amplifying the signals. The sensor 1 will output to the control unit 3 an analog signal proportional to the intensity of the lines of magnetic force (this will be described in detail later).

The pulse generator 2 generates pulse signals corresponding to the rotation (angle of rotation) of the pulley 13 during the operation of the conveyor system 10. As the rotation of the pulley 13 is virtually directly proportional to the travel of the belt 11 except for slight errors due to slippage between them, the number of pulses generated by the pulse generator 2 virtually indicates the amount of travel of the belt 11. Thus, the number of pulses generated after a given point on the belt will indicate the locations of the coils.

The control unit 3 provides analog-to-digital conversion of the signals from the sensor 1 and handles the converted signals as quantitative signals indicating the intensity. The control unit 3 also determines, on the basis of the number of pulses received from the pulse generator 2, the time when each coil w (or its embedment point) passes by the installation point of the sensor 1. If no signal (or just weak noise) is formed by the sensor 1 at the specified time, the control unit 3 will judge that a longitudinal tear occurred in the belt 11 and halt the operation of the conveyor system 10 and give an alarm.

Figure 3:
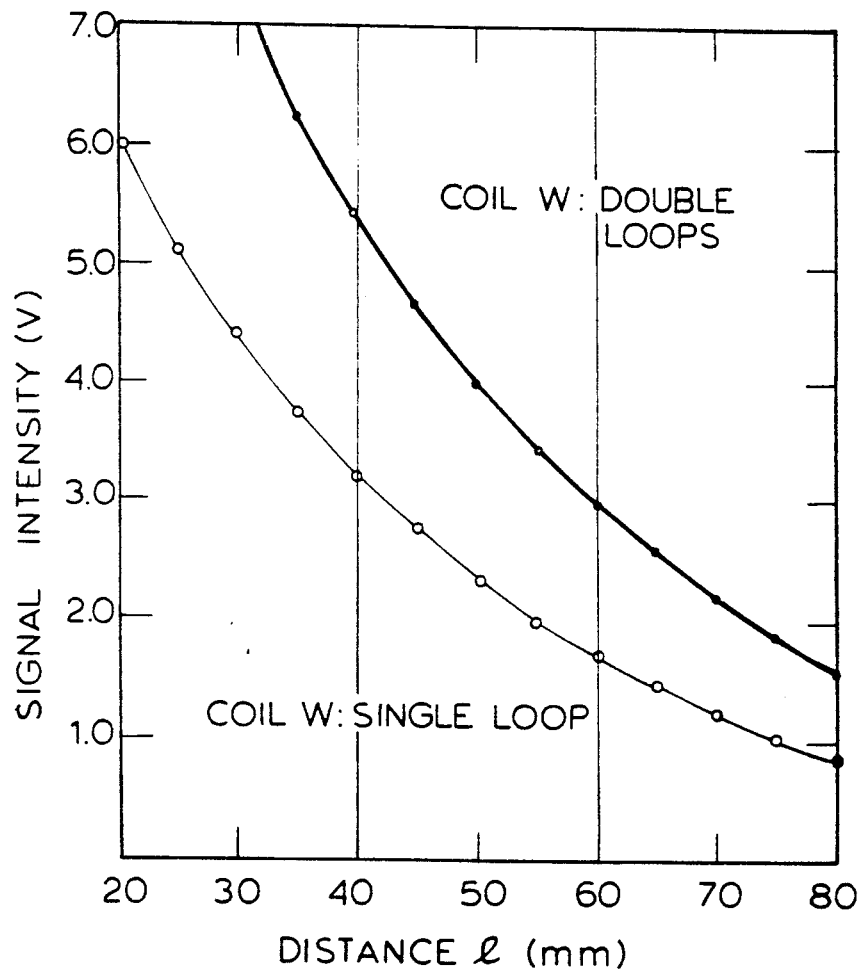
FIG. 3 shows the characteristics of intensity of the detection signals.

As described above, analog signals are outputted from the sensor 1. The intensity of the analog signal depends on the distance l between the coil w passing by and the sensor 1 and on the number of sound coils or turns in the coil w. FIG. 3 shows curves of the characteristics of the intensity of the signals from the sensor 1, according to a specific embodiment or example of the invention. In the conveyor system 10, the sensor 1 is installed near the belt 11 and the distance l is set at, for example, 50 mm. During the operation, however, the belt 11 swings up and down, hence the distance l varies within a range from 40 to 60 mm. For example, when the distance l increases, the signal intensity will decrease. For a given distance l, the signal intensity is lower for a single loop (with one loop of a coil w being broken), in comparison with double loops (with two sound loops), as shown in FIG. 3. For instance, when l=50 mm, the output of a single loop (2.3 V approx.) is less than 70% of the output of double loops (4.0 V approx.).

The control unit 3 processes the signals from the sensor 1 in the form of quantitative signals to judge the number of the coils w. As shown in FIG. 3, even in the case of double loops, if the distance l is close to 60 mm, the signal intensity is lower than that of a single loop with l=40 mm (3.2 V approx.). Hence it is not possible to make a hasty conclusion such as "when the output is less than 3.2 V, one of the loops of a coil w is broken." The control unit 3, therefore, judges the number of loops in the following manner: First, the control unit 3 stores quantitative signals of the outputs of the sensor 1 for the respective coils w (embedment points). The control unit then computes the averages of the signals of the respective coils w for the stored cycles (the number of turns or a test length of the belt 11). When the signal of a coil w is less than a standard or average value, the control unit will judge "one loop break" and sound an alarm about it. Such averaging of the signals from multiple turns rather than using a single signal eliminates errors due to variation of the distance l. In view of the individual variations of the signal intensity of the embedded coils w, in the present embodiment, the standard value is not set indiscriminately. Instead, the control unit 3 stores, as the initial value, the signal intensity of the coil w at each embedment point when all of the embedded coils w are integral such as during a test operation immediately after maintenance of the conveyor belt 11.

The control unit 3 may be a microprocessor which is connected to receive the signals from the pulse generator 2 and the sensor 1. The operational procedure of storage and computation of the control unit 3 is expressed by the flow chart shown in FIG. 1. In the chart, the notations are defined as follows:

$X_n$: the number of pulses produced by the generator 2 corresponding to the distance from the $(n-1)$th coil w to the nth coil w;

Y: the number of pulses counted from the time when the $(n-1)$th coil w was detected by the sensor 1 up to the present sensing time;

Z: the number of pulses corresponding to errors for identifying the embedment point of a coil w;

$A_n$: the initial value of the signal intensity given by sensor 1 for a coil w at the nth embedment point (the standard value when two loops are integral);

$\alpha$: the threshold of the signal intensity of sensor 1 for recognizing a signal as the signal of a coil w;

C: the intensity of the presently sensed signal from the sensor 1; and $D_n$: the average signal intensity (weighted average with 50% weight given to the latest data).

Figure 1:
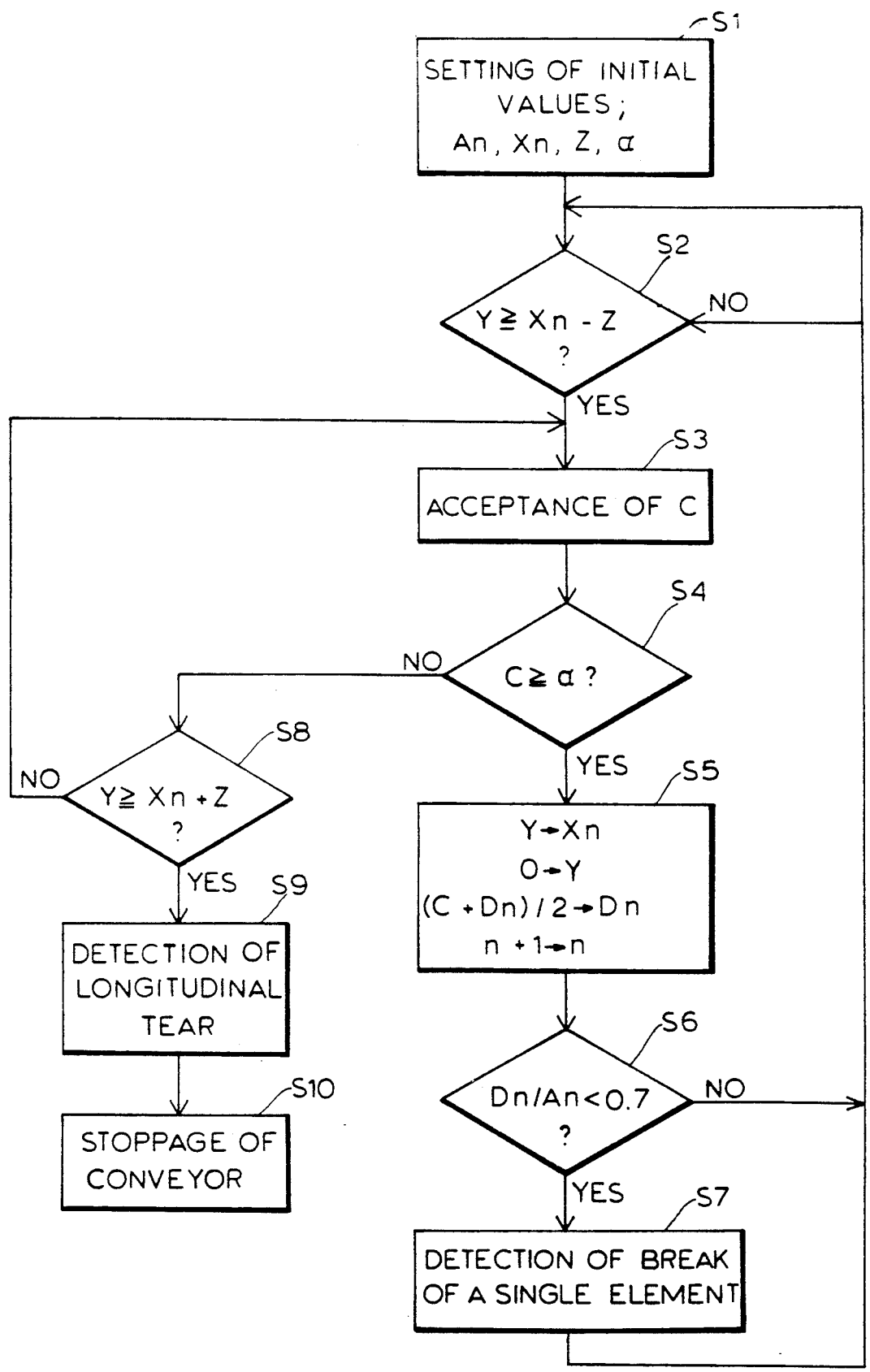
FIG. 1 is a flow chart concerning the key part of the method for detecting longitudinal tear.

The series of process steps of the control unit 3 shown in FIG. 1 is as follows:

First, when the operation of the conveyor system 10 is started, the control unit 3 stores the preset initial value $A_n$, the pulse numbers $X_n$ and Z, and the threshold value $\alpha$ (step S1). The threshold value $\alpha$ is set according to FIG. 3 at, for example, 0.5 V.

During operation, when the pulse number Y approaches to the pulse number $X_n$ and the difference is Z or less (step S2), the control unit will start to admit signals from the sensor 1 (step S3). From when the pulse number Y is $X_n - Z$ till the pulse number Y becomes larger than $X_n$ by Z, the control unit 3 waits for a signal having an intensity C not less than the threshold value $\alpha$ (steps S4, S8 and S3). During that period, if the control unit 3 does not receive any signal equal to or greater than the threshold value $\alpha$, the control unit 3 will judge that a longitudinal tear occurred in the belt 11 at the nth embedment point (step S9), and will halt the operation of the conveyor system 10 by means of the on-off control unit (not illustrated) of the conveyor system 10 (step S10) and will also give an alarm.

During the aforementioned period, if the sensor 1 gives a signal equal to or greater than the threshold value $\alpha$ to the control unit 3 (step S4), the control unit 3 will judge that no longitudinal tear is present, and will continue the operation of the conveyor system 10 and update the stored data (step S5). Namely, the $X_n$ is replaced by the actual pulse number Y at the time when the signal was accepted. The memory for Y is reset to zero. A new weighted average $D_n$ is calculated from the average $D_n$ up to the preceding turn (till the nth coil w passed by the installation point of the sensor 1 previously) and the latest value C. Moreover, to monitor the next $((n+1)$th) coil w, n is replaced by $n+1$.

If the average $D_n$ is around the initial value $A_n$ set when the two loops of the coil w were sound, the control unit 3 will return to the step S2 to repeat the procedure again. If the average $D_n$ is less than 70% of the initial value (step S6), the control unit 3 will judge that one loop of the coil w is broken (step S7) and display its judgment on a display panel (not illustrated) and return to the step S2. A break of one loop of the coil w does not require immediate stoppage of the conveyor system 10 for repair. However, the break should be repaired in the next periodic maintenance outage of the belt 11 according to the indication on the display panel.

In addition to the above-mentioned embodiment, the present invention instead may be executed in the following manner:

a) The detectable elements to be embedded in the conveyor belt are not limited to loop coils. Any element, such as a resonance circuit comprising a coil and a capacitor, of which linear part extends in the width direction of the belt 11 and which enables an appropriate sensor to detect a quantitative signal corresponding to the number of sound elements, will do.

b) To identify the embedment point of detectable elements in the belt, in place of a pulse generator, a timer may be used during a constant-speed operation, or a piece of magnet may be embedded near the embedment point as a mark for identifying the position.

c) The average of the signal intensity from the sensor 1 may be determined by various methods in addition to the weighted average of the embodiment. For example, the effects of the variation of the distance from the sensor to the belt can be eliminated by obtaining simple mean for several turns of the belt. However, if the number of signals from which a mean is calculated is too large and a greater importance is not given to the newer data, a break of one of the detectable elements cannot be judged instantly.

As will be clear from the explanation above, the present invention has the following advantages or effects:

With the method for detecting longitudinal tear according to the present invention, one can judge that one of two detectable elements embedded in the conveyor belt as a set at each embedment point is broken. The present invention, therefore, has the following effects:

1) If a broken detectable element of a set is repaired just after the breakage, two detectable elements will hardly break concurrently except when a longitudinal tear occurs in the belt. Thus the reliability of longitudinal tear detection will be improved. This means the number of stoppages of the conveyor due to malfunctions other than genuine longitudinal tears drops drastically, resulting in an improvement in the operating efficiency of the conveyor.

2) As explained above, concurrent breakage of both of the detectable elements of any set will hardly occur except in the case of a longitudinal tear. The method thus allows continuous monitoring of the presence or absence of any longitudinal tear, assuring highly reliable detection.

3) Partly depending on the kinds of detectable elements and sensors, it may be possible, in many cases, to apply the method for detecting longitudinal tear according to the present invention by merely adding some simple storing and computing functions to an existing control unit.

What is claimed is:

1. A method for detecting longitudinal tears in a conveyor belt, by detecting the breakage of detectable elements embedded at a plurality of points of embedment of a conveyor belt, the elements being sensed by an external sensor, and a detection signal of a breakage being sent to a control unit to determine, if any, a longitudinal tear in the belt, wherein at each of said points of embedment, a set of two of said detectable elements is embedded, said control unit being arranged to receive signals from said sensor, said signals having varied intensity corresponding to the number of undamaged detectable elements in a given embedment point, said method comprising the steps of (a) moving said conveyor belt and sensing signals from said detectable elements, (b) averaging the intensities of a plurality of said signals for a given embedment point, and (c) comparing said average with a comparison signal for said given embedment point to judge the presence or absence or breakage of detectable element or elements at the given embedment point.

2. Apparatus for detecting a longitudinal tear in a conveyor belt, comprising a plurality of points of embedment in said belt, each of said points of embedment comprising at least two detectable elements embedded in said belt and extending in the width direction of said belt, a sensor positioned adjacent said belt and responsive to said detectable elements, and control means connected to said sensor for comparing sensed signals with a comparison value, said control means including means for averaging a plurality of said sensed signals, and said average forming said comparison value.

* * * * *